United States Patent
Borgeaud et al.

[19]

[11] Patent Number: 6,006,885

[45] Date of Patent: Dec. 28, 1999

[54] FRICTION-IN-OIL DEVICE HAVING COAXIAL DISKS

[75] Inventors: Olivier Borgeaud, Assieu; Hervé Gumez, Lescar, both of France

[73] Assignee: Messier-Bugatti, Velizy Villacoublay, France

[21] Appl. No.: 09/128,708

[22] Filed: Aug. 4, 1998

[30] Foreign Application Priority Data

Aug. 5, 1997 [FR] France .................................. 97 10003

[51] Int. Cl.⁶ .................................................. F16D 11/00
[52] U.S. Cl. .................................. 192/107 R; 192/107 M
[58] Field of Search ............................ 192/107 M, 70.14, 192/107 R; 188/71.5; 475/257

[56] References Cited

U.S. PATENT DOCUMENTS

| | | | |
|---|---|---|---|
| 3,951,240 | 4/1976 | Dowell | 188/71.5 |
| 3,977,631 | 8/1976 | Jenny | 244/50 |
| 4,804,071 | 2/1989 | Schultz | 188/71.5 |
| 5,284,232 | 2/1994 | Prud'Homme | 192/70.21 |
| 5,503,254 | 4/1996 | Fisher et al. | 188/71.5 |
| 5,803,210 | 9/1998 | Kohno et al. | 188/73.1 |
| 5,860,890 | 1/1999 | Antonov | 475/257 |

FOREIGN PATENT DOCUMENTS

| | | |
|---|---|---|
| 0 537 088 | 4/1993 | European Pat. Off. . |
| 2 729 726 | 7/1996 | France . |
| 3801911 A1 | 8/1988 | Germany . |
| 37 12 898 | 11/1988 | Germany . |
| 8-093809 | 9/1994 | Japan . |
| WO 87 0662 | 4/1987 | WIPO . |
| WO 96/23144 | 1/1996 | WIPO . |

*Primary Examiner*—Charles A Marmor
*Assistant Examiner*—Tisha D. Waddell
*Attorney, Agent, or Firm*—Weingarten, Schurgin, Gagnebin & Hayes LLP

[57] ABSTRACT

The invention encompasses a friction-in-oil device having a plurality of coaxial disks comprising metal rotor or driving disks, metal stator or driven disks, and loose disks of carbon/carbon ("C/C") composite material, each loose C/C disk lying between a metal rotor or driving disk and a metal stator or driven disk. Each loose C/C disk is centered by a bearing surface formed in an adjacent metal rotor or stator disk, which bearing surface has passages for feeding oil to the interface between the loose C/C disk and the metal rotor or stator disk.

11 Claims, 2 Drawing Sheets

FRICTION-IN-OIL DEVICE HAVING COAXIAL DISKS

FIELD OF THE INVENTION

The present invention relates to a friction-in-oil device having coaxial disks of annular shape, and it relates more particularly to a friction device comprising metal disks alternating with disks made of a carbon—carbon composite material ("C/C disks").

Particular fields of application of the invention are automatic gear boxes, clutches, torque limiters, rotary friction dampers, brakes for machine shafts, and more generally any system using friction devices having disks in oil.

BACKGROUND OF THE INVENTION

C/C friction disks each constituted by a carbon fiber preform densified by a carbon matrix, are commonly used in brakes for aircraft and for competitive motor vehicles.

The behavior of carbon/carbon composite materials rubbing in oil against one another or against a metal, such as steel, makes it possible to consider using these materials in applications such as those mentioned above. C/C materials then present little wear and a coefficient of friction that is stable. In addition, they are relatively insensitive to speed effects, or to variations of unit-area pressure. Furthermore, friction with C/C materials in oil depends little on the nature and the viscosity of the oil in question.

Thus, document U.S. Pat. No. 5,409,428 describes an automatic gear box using C/C disks rubbing against metal disks in oil.

In friction devices using C/C disks, the disks are generally connected to the driving or rotary members and to the driven or fixed members by crenellations formed at the peripheries of the disks. In order to be able to take up forces at the crenellations, without running the risk of damage, it is necessary to use disks that are of sufficient thickness, thereby significantly increasing cost because of the high cost price of C/C materials.

OBJECTS AND SUMMARY OF THE INVENTION

An object of the present invention is to provide a friction-in-oil disk device making it possible to benefit from the properties of C/C disks at a cost that is advantageous.

This object is achieved by the fact that in a friction-in-oil device comprising metal disks alternating with C/C disks, the C/C disks are loose disks each interposed between a driving disk or rotor and a driven disk or stator.

In this way, no force needs to be taken up at the periphery of the C/C disks. The disks can therefore be relatively thin, thereby providing considerable savings and reducing bulk.

The C/C disks are advantageously centered by respective bearing surfaces formed on one of the adjacent metal disks, and having passages for feeding the interface between the metal disk and the C/C disk with oil.

It is important to ensure that oil is permanently present between the facing surfaces of the C/C disks and the metal disks in order to avoid any local overheating which could lead to damage and to deformation, and in order to ensure that the friction device operates properly and stably. To this end, chamfers can be formed along the edges of the C/C disks, at least along the outer edges thereof, while grooves can be formed in at least one of the two adjacent surfaces of a C/C disk and of a metal disk.

In addition, C/C materials obtained by densifying a fiber preform inevitably present some residual porosity, whatever the densification technique used: chemical vapor infiltration or impregnation by a carbon precursor in the liquid state (e.g. a resin), followed by carbonization. The residual porosity of C/C disks is useful for acting as an oil reservoir at the interfaces with the metal disks. Advantageously, the residual porosity is not less than 15% by volume.

A friction coupling device using a loose disk between a surface secured to a drive shaft and a surface secured to a driven shaft is described in document DE-A-3 712 898. Nevertheless, the loose disk is made of a sintered material and the assembly described is not capable of operating in satisfactory manner in oil.

C/C disks are preferably centered via their outer peripheries. This is because heat exchange with the oil is best in the outer zone of the disks, such that dimensional variations of the metal disks in that zone are minimized. This enables the loose C/C disks to be centered with the best possible accuracy.

Also advantageously, at least some of the metal disks may have an inside diameter smaller than that of the C/C disks. As a result, the inside portions of the metal disks are immersed in oil, but not in contact with the C/C disks, thus acting as radiators to provide better cooling.

Preferably, the metal disks are made of steel and they are carburized, at least on their friction surfaces so as to increase their resistance to abrasion.

BRIEF DESCRIPTION OF THE DRAWINGS

Other features and advantages of the friction devices of the invention appear on reading the following description given by way of non-limiting indication and with reference to the accompanying drawings, in which.

MORE DETAILED DESCRIPTION

Figure 1:
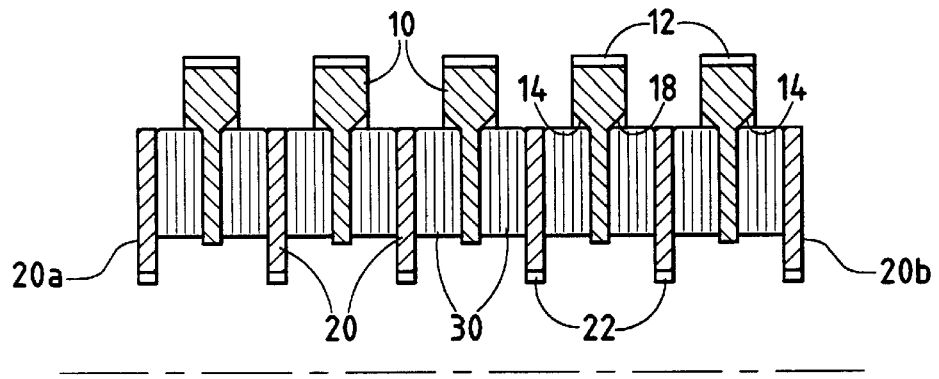
FIG. 1 is a highly diagrammatic section view of a disk friction device of the invention.

FIG. 1 shows a friction device formed by a stack of annular disks on a common axis, comprising a first group of metal disks 10 alternating with metal disks 20 in a second group, together with loose disks 30 of carbon-carbon (C/C) composite material interposed between the disks of the two groups.

The disks 10 and 20, e.g. made of steel, can be driven disks or driving disks, in a clutch or an automatic gear box, or, as in the example shown, rotor disks and stator disks in a torque limiter or a brake.

The stack of disks 10, 20, 30 is housed inside a case (not shown) which is filled with oil. In conventional manner, the disks can be pressed against one another in the axial direction by means of an actuator device (not shown) acting on the end stator disks 20a and 20b.

Figures 5, 6:
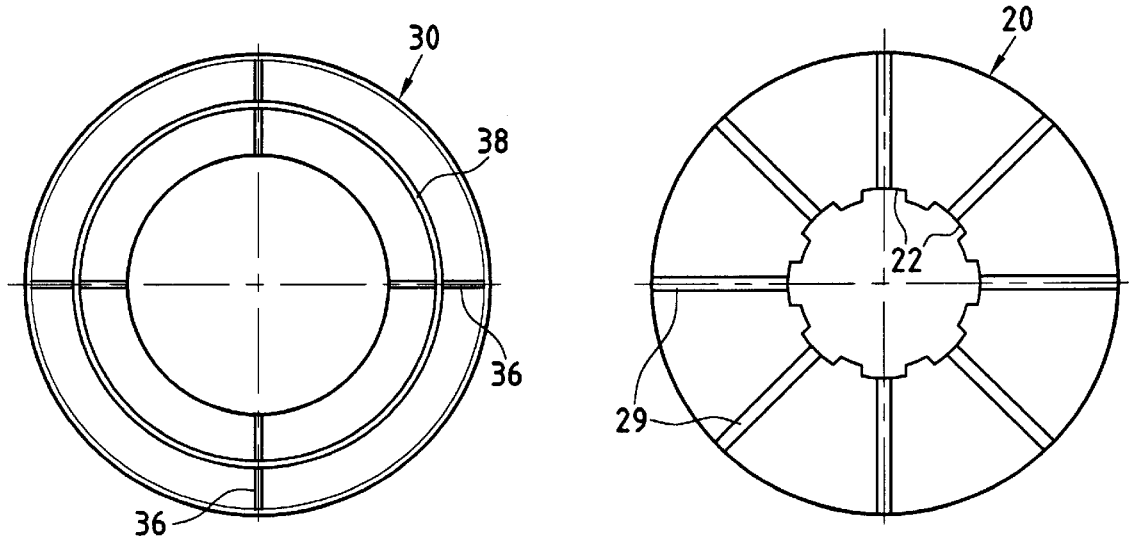
FIGS. 5 and 6 are face views showing variant embodiments of the disks of the FIG. 1 device.

The rotor disks 10 are connected to a rotary member by means of crenellations 12 formed in their outer peripheries (FIGS. 1 and 2), while the stator disks 20 are connected to a fixed member by means of crenellations 22 formed in their inner peripheries (FIGS. 1 and 5). Naturally, in a variant, the connection crenellations of the rotor disks could be formed at the inner peripheries thereof and those of the stator disks at the outer peripheries thereof.

The loose disks 30 are centered by means of bearing surfaces 14 constituted by steps formed in the faces of the rotor disks 10 so that the thickness of the rotor disks in register with their friction faces is smaller than their thickness in register with their outer rings 15. As already mentioned, centering the loose disks via their outer peripheries instead of via their inner peripheries is preferable because thermally originating expansion of the metal disks is smaller in the outer zone of the stack of disks where heat exchange with the oil is good.

It is important to avoid temperatures that are too high appearing on the friction surfaces since that could lead to damage and to deformation. To this end, the interfaces between the disks should be fed with oil, and the flow of oil in the interfaces should be encouraged.

Because of its residual porosity, the C/C material of the disks 30 constitutes a reservoir of oil adjacent to the friction surfaces. This porosity is controlled by the degree to which the material is densified, is preferably not less than 15% by volume so as to perform this reservoir function, and is preferably no greater than 40% so as to ensure that the C/C material conserves the desired mechanical properties.

Figure 2:
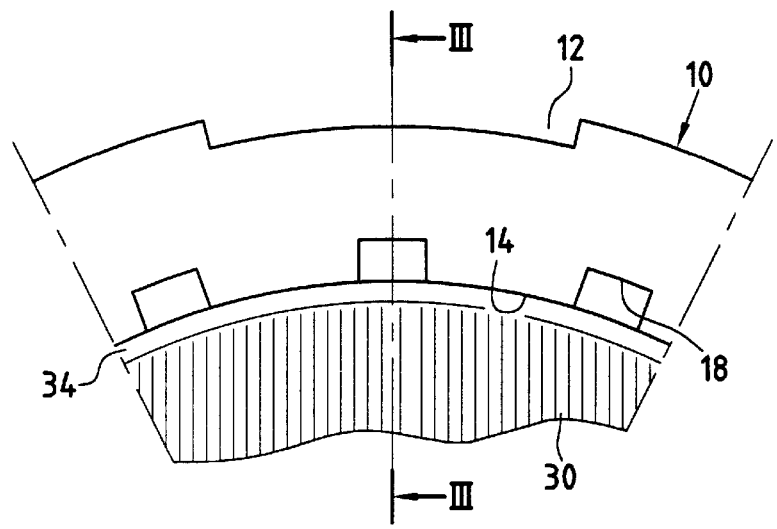
FIG. 2 is a fragmentary front view showing a detail of a centering bearing surface formed on a metal rotor disk of the FIG. 1 device.
Figure 3:
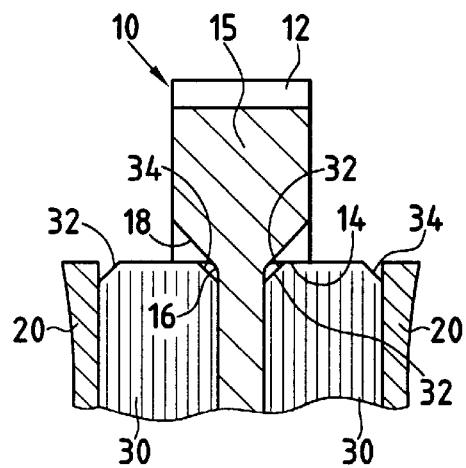
FIG. 3 is a section view on plane III—III of FIG. 2, also showing a portion of adjacent metal C/C disks.

As shown more particularly in FIGS. 2 and 3, the centering bearing surfaces 14 run into the friction faces of the disks 10 via rounded surface portions 16, and bevelled notches 18 are machined radially in the steps forming the bearing surfaces 14. In addition, chamfers 32, 34 are formed along the outer edges of the disks 30. The chamfers 32, 34 co-operate with the bevelled notches 18 to bring oil to the interfaces between the rotor disks and the loose disks, and facilitate the feeding of oil to the interfaces between the stator disks and the loose disks. As for the rounded connection portions 16, they contribute not only to improving the stiffness of the rotor disks 10, but also to improving the flow of oil between the rotor disks and the loose disks.

Figure 4:
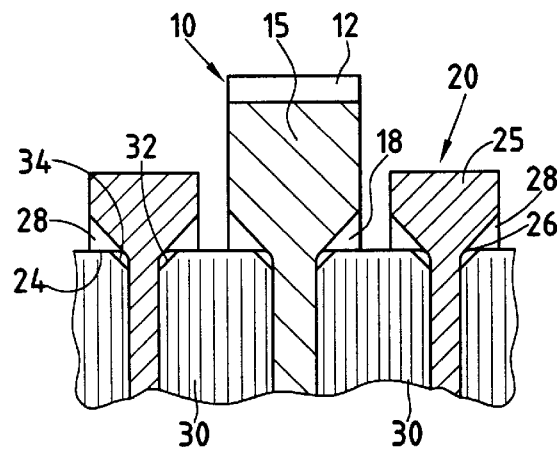
FIG. 4 is a section view similar to that of FIG. 3, showing a variant embodiment of the metal disks.

FIG. 4 shows a variant embodiment which differs from that of FIGS. 1 to 3 by the fact that the stator disks 20 have an enlarged outer ring which is connected to the rubbing faces via steps 24. The notches 28 are formed in the inside portion of the ring 25 to cooperate with the chamfers 32, 34 to facilitate feeding oil to the interface between the disks 20 and the disks 30, in the same manner as the notches 18 which facilitate the feeding of oil to the interface between the disks 22 and the disks 30. In addition, the steps 24 are connected to the friction faces of the disks 20 via rounded surface portions 26.

In the embodiment of FIG. 4, it will be observed that the disks 30 can be centered either by the bearing surfaces 14 on the disks 10, or by the steps 24 on the disks 20 which then constitute centering bearing surfaces.

In order to ensure that a sufficient volume of oil is permanently retained between the friction surfaces, grooves may be formed therein, in the metal disks 10, 20 and/or in the C/C disks 30. FIG. 5 shows radial grooves 36 and a circumferential groove 38 formed in a face of a disk 30, while FIG. 6 shows radial grooves 29 formed in a face of a stator disk 20.

The metal disks are advantageously used as radiators for dumping the heat generated by the friction. Thus, the rotor disks 10 have an inside diameter smaller than the inside diameter of the loose disks, so as to present internal portions that are freely immersed in oil, in addition to their outer portions. Likewise, the stator disks 20 are of inside diameter that is perceptibly smaller than the inside diameter of the loose disks, and specifically smaller than the diameter which is strictly necessary for providing the crenellations 22.

Whatever the intended application for the friction device of the invention, it is preferable to use metal disks having high-grade mechanical characteristics so as to avoid any deformation or work hardening of the friction surfaces and so as to guarantee contact with the C/C loose disks that is as close as possible to perfect. Advantageously, the metal disks are made of steel and their friction faces are carburized, e.g. by cementation, so as to increase the abrasion resistance thereof.

By way of example, the following steels can be used:

42CD4 steel (0.42% C, 0.25% Si, 0.75% Mn, 1.10% Cr, 0.22% Mo, with the balance being essentially Fe) that has been quenched and annealed so as to have an elastic limit ($R_e$) that may reach 900 MPa and a hardness of not less than 410 HV; and 16NCD13 steel (0.18% C, 0.65% Mn, 3.5% Ni, 1.4% Cr, 0.15% Mo, with the balance being essentially Fe) that has been cemented and quenched, so as to have an elastic limit $R_e$ that may reach 830 MPa and hardness of not less than 360 HV.

Other grades of steel can be used, for example XC48/50 steel (0.50% C, 0.25% Si, 0.75% Mn, at least 0.03% S, with the balance being essentially Fe) that has been quenched and annealed, or 20NCD2 steel (0.21% C, 0.25% Si, 0.75% Mn, 0.50% Cr, 0.20% Mo, 0.55% Ni, with the balance being essentially Fe) that has been quenched and annealed.

By way of example, the loose C/C disks 30 are made in a manner analogous to that used for C/C disk brakes, by making annular carbon fiber preforms and by densifying the preforms with a carbon matrix.

Techniques for making annular preforms are well known and are described for example, in the following documents: FR-A-2 726 013 and FR-A-2 741 634. The fibers used can come from various precursors, such as polyacrylonitrile (PAN) or pitch.

By way of example, the following C/C materials can be used:

a material based on pre-oxidized PAN fibers having a fiber volume ratio of 15% to 30% (percentage of the volume of the material that is actually occupied by the fibers), a pyrolytic carbon matrix obtained by chemical vapor infiltration so that the matrix has a volume ratio of 50% to 70%, and a residual porosity ratio of 15% to 30%;

a material based on pre-oxidized PAN fibers having a fiber ratio of 15% to 30%, a pyrolytic carbon matrix obtained by impregnating phenolic resin and carbonizing at 900° C., with the matrix ratio being 50% to 70%, and the residual porosity ratio between 15% to 30%;

a material based on carbon fibers having a PAN or pitch precursor with a fiber ratio of 25% to 30%, a pyrolytic carbon matrix obtained by chemical vapor infiltration or by impregnating with a phenolic resin, and carbonization at 900° C. with a matrix ratio of 40% to 55%, and a residual porosity ratio of 20% to 30%; and a material similar to the preceding material, but that has been subjected to partial siliciding so as to obtain a combined pyrolytic carbon and silicon carbide matrix (where siliciding can be performed by impregnating with molten silicon, as described in document FR-A-2 741 063).

After the disks have been made, the C/C material can be subjected to high temperature heat treatment, e.g. at about 2200° C. The resulting graphitization improves the thermal conductivity and makes it possible to reduce the operating temperature of the loose disks.

Such C/C materials have excellent friction behavior in oil, and in particular their friction characteristics are stable and reproducible (for given porosity ratio), they suffer very little wear, and they are highly insensitive to variations in inertial speed or unit-area pressure. In addition, the behavior of C/C materials depends very little on the nature and the viscosity of the oil used. Anti-oxidizing or anti-wear agents, e.g. various esters, silicones, siloxanes, polyglycols, or polyolefins, can be added to the oil without degrading the performance of C/C materials.

The present invention is particularly remarkable by the fact that it makes it possible to take advantage of the qualities of C/C materials at an advantageous cost since the loose disks can be of limited thickness and there is no need to machine crenellations in the peripheries thereof.

A particular application of the invention to a torque limiter is described below.

The torque limiter had two C/C loose disks with an outside diameter of 180 mm, an inside diameter of 100 mm, and a thickness of 8 mm. The disks were placed on either side of a core disk of 10 mm thick steel. The disk was made of 42CD4 steel that had been quenched and annealed, having an elastic limit $R_e$>900 MPa and a surface state ra=0.2. The core disk was rotated by a transmission shaft while a presser device acted on the two end disks that were made of steel and secured to another transmission shaft. The end disks were made of the same steel as the core disk.

Each graphitized C/C composite loose disk comprised a preform of PAN precursor carbon fibers densified by a pyrolytic carbon matrix obtained by chemical vapor infiltration. The fiber volume ratio was 15%, and the residual porosity volume ratio was equal to about 20%.

The torque limiter was used in a commercially available synthetic oil. The torque limiter ensured that both transmission shafts rotated at the same speed up to the slip limit. The measured triggering torques were repeatable, being equal to about 400 m.N and being constant over time.

We claim:

1. A friction-in-oil device having a plurality of coaxial disks comprising metal rotor or driving disks and metal stator or driven disks alternating with loose disks of carbon/carbon ("C/C") composite material wherein the loose C/C disks are each interposed between a metal rotor or driving disk and a metal stator or driven metal disk.

2. A device according to claim 1, wherein each loose C/C disk is centered by a bearing surface formed in an adjacent metal rotor or stator disk and has passsages for feeding oil to an interface between one said metal rotor or stator disk and one said loose C/C disk.

3. A device according to claim 2, wherein each loose C/C disk is centered via its outer periphery.

4. A device according to claim 1, wherein chamfers are formed along the outer edges of the loose C/C disks.

5. A device according to claim 1, wherein grooves are formed in at least one of the two adjacent surfaces of a loose C/C disk and a metal rotor or stator disk.

6. A device according to claim 1, wherein the C/C material of the loose disks has residual porosity of not less than 15%.

7. A device according to claim 1, wherein the C/C material of the loose disks has residual porosity of not more than 40%.

8. A device according to claim 1, wherein the C/C material of the loose disks is graphitized.

9. A device according to claim 1, wherein at least some of the metal rotor or stator disks have an inside diameter smaller than the smaller diameter of the loose C/C disks so that their inside portions form radiators immersed in oil.

10. A device according to claim 1, wherein the metal rotor or stator disks are made of steel.

11. A device according to claim 10, wherein the steel disks are carburized on their friction surfaces.

* * * * *